April 1, 1930.   S. T. THORPE ET AL   1,752,865
FISHING ROD
Filed Nov. 7, 1927
Fig. 1.
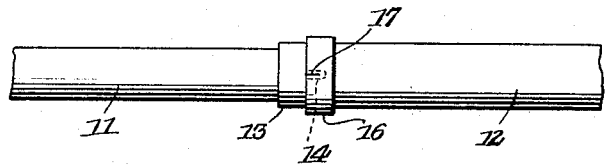
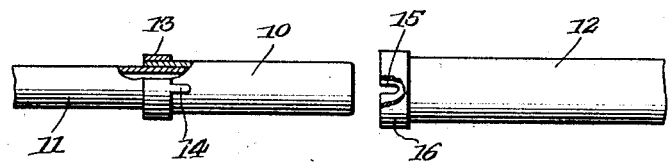
Fig. 2.
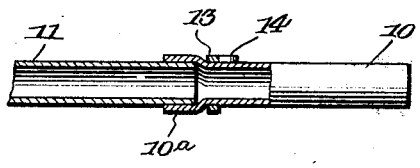
Fig. 3.
INVENTORS,
S. T. Thorpe,
BY N. P. Peterson,
Church & Church
their ATTORNEYS Patented Apr. 1, 1930

1,752,865

UNITED STATES PATENT OFFICE

SAMUEL T. THORPE AND NILS P. PETERSON, OF BRISTOL, CONNECTICUT, ASSIGNORS TO THE HORTON MANUFACTURING COMPANY, OF BRISTOL, CONNECTICUT, A CORPORATION OF CONNECTICUT

FISHING ROD

Application filed November 7, 1927. Serial No. 231,718.

This invention relates to improvements in fishing rods and particularly to sectional, hollow tubular rods.

Primarily, the invention contemplates a sectional rod whose sections, when assembled, are locked together against relative rotation. When sectional rods are being used, the strain on the fishing line through the runners on the several sections tends to twist or turn one section with respect to the others. This is especially true in the shorter rods having comparatively large runners. The greatest degree of twist also takes place in the outer or tip section of the rod. It is this difficulty or annoyance to the fisherman which the present invention seeks to overcome by the provision of a novel form of locking means that securely hold the several sections against rotation with respect to one another.

A further object is to so arrange said locking elements that they will be totally concealed when the several rod sections are assembled. In this way, the appearance of the rod is not marred by any visible projections, slots or recesses.

More particularly, the invention consists in placing on one rod section a sleeve formed with a projection which, when said section is telescoped within another section, enters a recess in said other section and holds the two sections against relative rotation, said recess and projection being totally concealed by a second sleeve on the recessed section. Incidentally, this second sleeve may have a suitable mark thereon, indicating the location of the underlying recess, thereby facilitating assembly of the sections.

With these and other objects in view, the invention consists in certain novel details of construction and combinations and arrangements of parts, all as will hereinafter be more fully described and the novel features thereof particularly pointed out in the appended claims.

In the accompanying drawings:—

Figure 1 is an elevational view of the end portions of two rod sections assembled.

Fig. 2 is a similar view showing sections disassembled.

Fig. 3 illustrates a modified form of rod section embodying the present invention.

In accordance with general practices, that end of the rod section which is adapted to telescope into the end portion of the next adjacent rod section, has secured thereon, in any suitable fashion, a ferrule 10, such ferrule being capable of taking the rather high finish which facilitates the insertion thereof into the adjacent rod section. In the present illustration, ferrule 10 is shown attached to a rod section 11, while the adjacent rod section is shown at 12, and in the preferred embodiment of the present invention ferrule 10 has fixedly secured thereon a stop 13, which has formed integrally therewith one of the locking elements 14. If desired, stop 13 may take the form of a ring or sleeve surrounding ferrule 10, and locking element 14 may be described as consisting of a finger or projection extending longitudinally of the rod section toward the end of said section and ferrule. The co-operating locking member, carried by rod section 12, simply consists of a notch or recess 15, extending longitudinally of said section from the end thereof which is adapted to be slipped over ferrule 10. As will be readily understood, when section 11 is inserted in section 12, the finger or projection 14 will enter the recess or notch 15, and so long as said projection is retained in said notch, the two members will be held against rotation, one with respect to the other.

It is, of course, desirable that the appearance of the finished rod be as neat as possible, and for this reason means are provided for concealing the co-operating locking elements 14, 15. Such means of concealment consist of a sleeve secured on one of the rod sections in position to overlie both the recess 15 and the finger projection 14 when the two rod sections are assembled. As shown, this ring or sleeve, indicated at 16, is attached to the end of rod section 12 and completely overlies the recess 15 so that when the projection 14 is received in said recess, both the projection and recess will be completely hidden. In this way, no opening in either of the rod sections nor the projection is visible. Additionally, the ring or sleeve 16 serves to reinforce the end of the rod section and tends to prevent distortion of member 14.

It will be understood that the ferrule 10 is shown in the present instance as an illustration of common practice in the industry, and, if desired, the same may be dispensed with and sleeve 13 attached directly to the rod section.

In the form of rod where the exterior surface of the ferrule is perfectly plain, the ring 13 functions as a stop to limit the insertion of rod section 11 in the rod 12. In this event, sleeve 13 is made rather wide, in order to permit it to be securely fastened on the ferrule. However, in the type of rod illustrated in Fig. 3, wherein the ferrule 10 is formed with an offset or enlarged portion 10ª ring 13, may be made considerably narrower, as pressure exerted on it when the rod sections are assembled will be transmitted to the enlarged portion 10ª of the ferrule.

With the exception of the enlargement of the ferrule in this modified form, the locking of the two sections against relative rotation is accomplished in the same way as in Figs. 1 and 2. In other words, the narrow ring 13 has the projection 14, which is adapted to co-operate with the recess in the end of the adjacent rod section.

In view of the fact that recess 15 is always totally concealed by the ring or sleeve 16, the location of said recess beneath the ring is noted by an indication, such as a line or mark 17, on the exterior of said sleeve. This facilitates the assembly of the rod sections as the fisherman need only arrange indication 17 in alinement with the projection 14, whereupon the latter will be in registry with the recess so as to readily enter the same.

We claim:—

1. A joint for a sectional fishing rod, said joint comprising two sections, one section having a ferrule on one end thereof telescoped within the other section, a sleeve on said ferrule, cooperating interlocking means on said sleeve and the other section holding the two sections against relative rotation, and a sleeve fixedly secured on the other section concealing said locking means when the two sections are telescoped.

2. A joint for a sectional fishing rod comprising two sections, one section being telescoped at one end into one end of the other section and frictionally held therein, the first section having a sleeve thereon formed with a projection adapted to enter a recess in the end of said other section, a sleeve on said other section overlying said recess and adapted to conceal both the recess and said projection when the two sections are telescoped, and means on the exterior of the sleeve on said other section denoting the location of said recess beneath the sleeve to facilitate alining said recess and projection when assembling the sections.

SAMUEL T. THORPE.
NILS P. PETERSON.